United States Patent
Schelfaut et al.

(10) Patent No.: US 11,933,232 B1
(45) Date of Patent: Mar. 19, 2024

(54) HYBRID-ELECTRIC GAS TURBINE ENGINE AND METHOD OF OPERATING

(71) Applicant: GENERAL ELECTRIC COMPANY, Schenectady, NY (US)

(72) Inventors: Timothy L. Schelfaut, Lebanon, OH (US); Timothy M. Kasberg, Liberty Township, OH (US); Tyler F. Hooper, Amesbury, MA (US); Massimo Rufo, Woburn, MA (US); Kevin Graziano, Liberty Township, OH (US); Brendon Leeker, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/171,942

(22) Filed: Feb. 21, 2023

(51) Int. Cl.
| F01D 11/18 | (2006.01) |
| F02C 6/00 | (2006.01) |
| F02C 7/36 | (2006.01) |
| F02C 9/56 | (2006.01) |

(52) U.S. Cl.
CPC ............... *F02C 9/56* (2013.01); *F02C 6/00* (2013.01); *F02C 7/36* (2013.01); *F05D 2220/32* (2013.01); *F05D 2220/70* (2013.01); *F05D 2270/05* (2013.01); *F05D 2270/13* (2013.01)

(58) Field of Classification Search
CPC ...... F02C 9/56; F02C 6/00; F02C 7/36; F05D 2220/32; F05D 2220/70; F05D 2270/05; F05D 2270/13; F01D 11/14; F01D 11/18; F01D 11/20; F01D 11/24
See application file for complete search history.

(56) References Cited

U.S. PATENT DOCUMENTS

| 4,999,991 A | 3/1991 | Haddad et al. |
| 8,296,037 B2 | 10/2012 | Plunkett et al. |
| 9,657,587 B2 | 5/2017 | Bacic et al. |
| 9,758,252 B2 | 9/2017 | Adibhatla et al. |
| 10,364,694 B2 | 7/2019 | Ribarov et al. |
| 10,414,507 B2 | 9/2019 | Schelfaut |
| 10,746,042 B2 | 8/2020 | Veilleux, Jr. et al. |
| 11,339,678 B2 | 5/2022 | Feulner |
| 11,428,171 B2 | 8/2022 | Brown et al. |
| 2013/0147192 A1* | 6/2013 | Condon ............... F02C 7/268 |
| | | 290/34 |
| 2019/0345837 A1* | 11/2019 | Bacic ............... F02K 5/00 |
| 2020/0025149 A1* | 1/2020 | Hrach ............... F01D 11/14 |
| 2020/0332726 A1 | 10/2020 | Kehoe et al. |
| 2021/0172384 A1 | 6/2021 | Brown et al. |
| 2022/0194620 A1* | 6/2022 | Lopez Guzman ........ F02C 6/00 |

FOREIGN PATENT DOCUMENTS

WO 2015094622 A1 6/2015

* cited by examiner

*Primary Examiner* — Steven M Sutherland
(74) *Attorney, Agent, or Firm* — McGarry Bair PC

(57) ABSTRACT

A hybrid-electric gas turbine engine and method of operating includes independently controlling a first electric machine providing torque to a first shaft to maintain a desired clearance between a first set of blades rotatably coupled to the first shaft, and a casing.

20 Claims, 4 Drawing Sheets

HYBRID-ELECTRIC GAS TURBINE ENGINE AND METHOD OF OPERATING

TECHNICAL FIELD

This disclosure relates generally to hybrid-electric gas turbine engines, and more specifically to multi-spool, hybrid-electric gas turbine engines having electric machine assemblies.

BACKGROUND

Turbine engines, including gas or combustion turbine engines, and hybrid-electric gas turbine engines, are rotary engines that extract energy from a flow of combusted gases. Turbine engines generally include a compressor, combustor, and turbine in serial flow arrangement. The compressor compresses air which is supplied to the combustor where it is mixed with fuel. The mixture is then ignited to generate hot combustion gases. The combustion gases are supplied to the turbine, which extracts energy from the combustion gases for powering the compressor, as well as for producing useful work to propel an aircraft in flight or to power a load, such as an electrical generator. Hybrid-electric type turbine engines can additionally include at least one electric machine or motor that can be controlled to input additional power to one of the rotating elements of the turbine engine.

BRIEF DESCRIPTION OF THE DRAWINGS

A full and enabling disclosure, including the best mode thereof, directed to one of ordinary skill in the art, is set forth in the specification, which refers to the appended figures in which.

DETAILED DESCRIPTION

Figure 1:
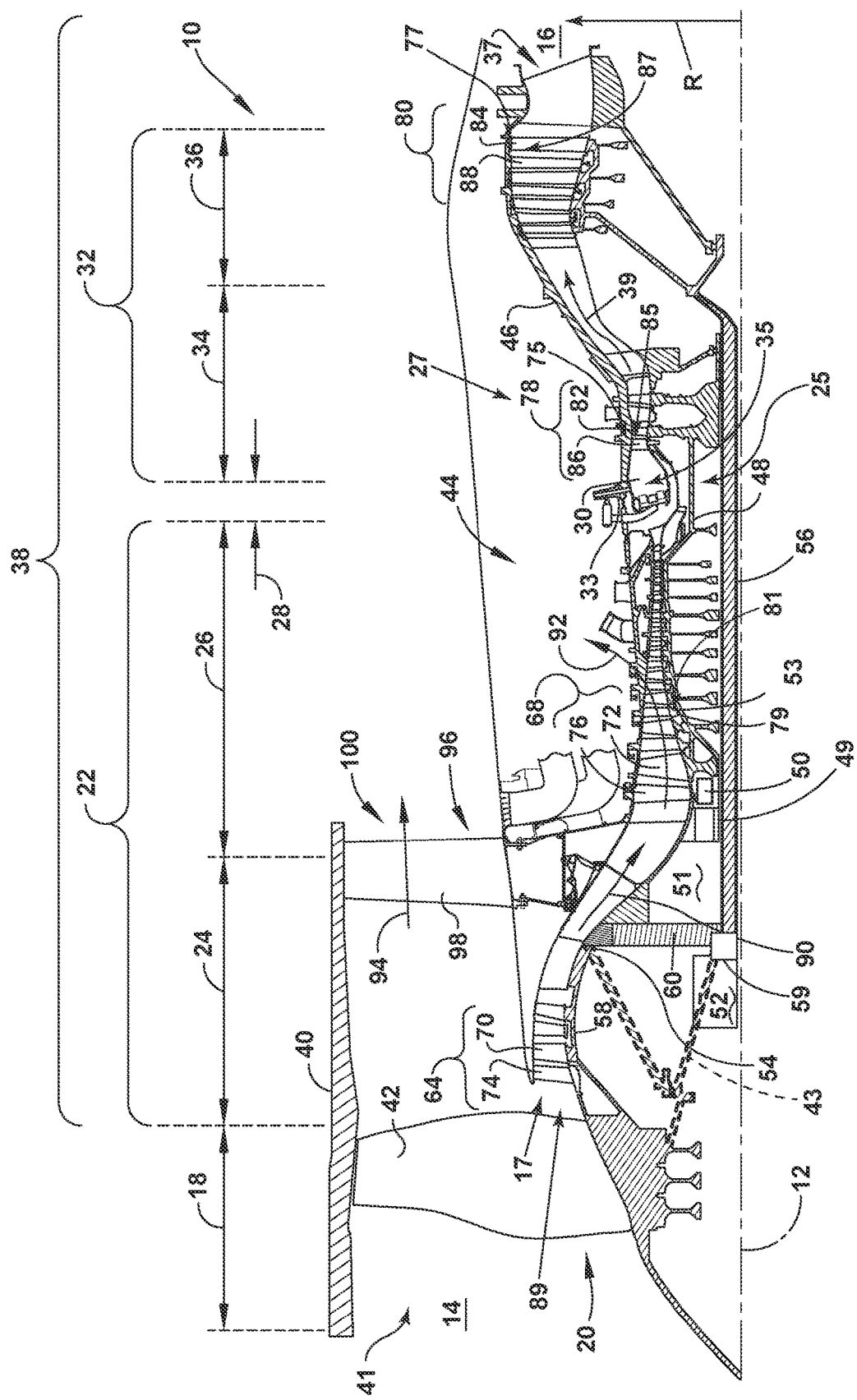
FIG. 1 is a schematic cross-section view of a hybrid-electric gas turbine engine according to aspects of the present disclosure.

Reference will now be made in detail to present aspects of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

For purposes of illustration, the present disclosure will be described with respect to a turbine engine for an aircraft. The disclosure can have applicability in a variety of vehicles or engines, and can be used to provide benefits in industrial, commercial, military, and residential applications. Further non-limiting examples of other vehicles or engines to which the disclosure can relate can include boats, helicopters, cars, or other aquatic, air, space, or land vehicles. Industrial, commercial, or residential applications of the disclosure can include, but are not limited to, marine power plants, wind turbines, hybrid-electric machines, or small power plants.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all aspects described herein should be considered exemplary.

As used herein, the terms "first," "second," and "third" can be used interchangeably to distinguish one component from another and are not intended to signify location or importance of the individual components. The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein.

The terms "forward" and "aft", as used herein, refer to relative positions within a hybrid-electric gas turbine engine or vehicle, and refer to the normal operational attitude of the hybrid-electric gas turbine engine or vehicle. For example, with regard to a blade, forward refers to a position closer to the leading edge of the airfoil and aft refers to a position closer to the trailing edge.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the term "fluid" as used herein can be a gas or a liquid. The term "fluid communication" means that a fluid is capable of making the connection between the areas specified.

As used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

As used herein, a "controller", for example, "control module", "regulator module", "integrator module" can include a component configured or adapted to provide instruction, control, operation, or any form of communication for operable components to affect the operation thereof. Such controllers or modules can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. While described herein as comprising separate elements, in non-limiting aspects such controllers and modules can be incorporated on one or more devices including a common device, such as a single processor or microcontroller. Non-limiting examples of such controllers or module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module, regulator module, or integrator module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Electric machines, such as electric motors or electric generators, are used in energy conversion. In the aircraft industry, it is common to use motors and generators in various critical applications. For example, in some aircraft having a gas turbine engine, an electric machine can be used to provide power to the turbine compressor. In other instances, electric machines can combine a motor mode and a generator mode in the same device, where the electric machine operating in motor mode functions to provide an output torque to the engine, and, in generator mode, also functions as an electrical generator. Regardless of the mode, an electric machine typically includes a rotor and a stator with windings that are driven to rotate the rotor, which for some aircraft may include the gas turbine engine.

As used herein, a stage of either a compressor or a turbine can refer to a pair of an adjacent set of blades and set of vanes in a flow direction, with both sets of the blades and vanes circumferentially arranged about an engine centerline. The blades rotate relative to the engine centerline and, in one example, are mounted to a rotating structure, such as a disk, to affect the rotation. A pair of circumferentially-adjacent vanes in the set of vanes can be referred to as a nozzle. The vanes, in one example, can be stationary, and mounted to a casing surrounding the set of blades, and, in another example of a counter-rotating engine, are mounted to a rotating drum surrounding the set of blades. The rotation of the blades can create a flow of air through the vanes/nozzles.

Conventional hybrid-electric gas turbine engines typically include a fan section, a compressor section, a combustor section and a turbine section. Air entering the compressor section is compressed and delivered into the combustion section, where it is mixed with fuel and ignited to generate a relatively high-temperature high-speed exhaust gas flow of combustion gasses. The high-energy exhaust gas flow expands through the turbine section to rotatably drive the compressor and the fan section. At least one electric machine (e.g., an electric motor) can supplement the rotational force provided by the high-energy exhaust gas flow from the combustor. The compressor section typically includes low and high-pressure compressors, and the turbine section includes low and high-pressure turbines. The high-pressure turbine drives the high-pressure compressor through an outer shaft to form a high-pressure spool, and the low-pressure turbine drives the low-pressure compressor through an inner shaft to form a low-pressure spool. The fan section may also be driven by the low-pressure spool inner shaft, either directly or indirectly through a fan drive gear system.

For hybrid-electric gas turbine engines, engine efficiency can depend at least in part on clearances between rotating and stationary components, such as a rotating turbine blade and a stationary casing surrounding the turbine blade. As used herein, the term "clearance" refers to a gap or space defined between a rotating part and an adjacent stationary part. For example, as used herein, the term "clearance" such as a "blade tip clearance" can refer to a clearance or gap between a respective tip (e.g., a radially outward tip) of one or more blades (e.g., a turbine blade) and an immediately adjacent casing (e.g., a radially inward surface of the casing). In another non-limiting instance, the term "clearance" can refer to a clearance or gap between a respective set of seal teeth and a rub element of a compressor vane. Typically, the tighter or smaller the clearance or gap between rotating and stationary parts (e.g., the tips of the blades and the casing), the more efficiently the hybrid-electric gas turbine engine can be operated. Thus, it is generally desirable to minimize clearances to optimize the hybrid-electric gas turbine engine performance and efficiency.

One challenge in minimizing the blade tip clearance is that the high-temperature combustion gas flow typically impacts the rotating turbine blades prior to impacting the stationary casing that circumferentially surrounds the turbine blades, thereby resulting in different rates of thermal expansion and contraction of the rotating turbine blades and the stationary casings. Furthermore, the thermal response of the casing, blades, and rotor can occur at different rates that are dependent on the transient thermal environment of the respective parts. This can be particularly challenging when thrust demand is rapidly increased or decreased, thereby rapidly increasing or decreasing the temperature of the high-energy exhaust gas flow from the combustor. For example, if a blade tip clearance is too small, a rapid linear expansion of the turbine blade, (e.g., due to a transient increase in a thrust demand), can result in a so-called "rub event" in which the turbine blade tips contact or rub against the adjacent casing. Rub events can cause poor engine performance and efficiency, reduce the effective service lives of the turbine blades and the shrouds, and can reduce the exhaust gas temperature margin of the engine. Thus, blade tip clearances are typically set to minimize the clearance between the blade tips and the casings while still providing sufficient clearance to avoid rub events. Turbine blade tip clearances for aircraft are typically sized such that the engine can perform a step climb without experiencing a turbine blade rub event. Accordingly, hybrid-electric gas turbine engines typically employ clearances, such as blade tip clearances, that are larger than needed for optimized engine performance and efficiency because they are sized to account for relatively rapid expansion of the turbine blades occurring due to transient engine bursts and acceleration.

In some known instances, hybrid-electric gas turbine engines are controlled such that the rate of thrust increase of the engine is limited, for example by limiting or gradually increasing the fuel flow to the combustor in accordance with a predetermined maximum rate of increase of acceleration, which allows blade tip clearance closure to be minimized by offsetting component mechanical and thermal deflections. This advantageously allows the blade tip clearances to be set more closely than they would be otherwise, and consequently, better engine efficiency can be achieved during cruise operation. However, limiting the rate of thrust increase of the engine decreases the responsiveness of the engine, which pilots and aircrew personnel may find undesirable. Furthermore, limiting the rate of thrust of the engine by limiting or gradually increasing the fuel flow to the combustor, simultaneously effects the rate of increase of both the high-pressure spool and low-pressure spool, regardless of the relative size of the blade tip clearances on the high and low-pressure spools.

Thus, a hybrid-electric gas turbine engine that addresses one or more of the challenges noted above would be beneficial. Further, a method of operation of a hybrid-electric gas turbine engine that addresses one or more of the challenges noted above would likewise be useful.

FIG. 1 is a schematic view of a hybrid-electric gas turbine engine 10. The hybrid-electric gas turbine engine 10 can be mounted to an aircraft (not shown), such as a fixed-wing aircraft, and can produce thrust for propulsion of the aircraft. The hybrid-electric gas turbine engine 10 has a centerline or longitudinal axis that can define an axis of rotation 12 for the hybrid-electric gas turbine engine 10. The axis of rotation 12 can extend longitudinally forward 14 to aft 16. For reference, the hybrid-electric gas turbine engine 10 also defines a radial direction R and a circumferential direction. In general, the radial direction R extends outward from and inward to the axis of rotation 12 in a direction orthogonal to the axis of rotation 12, and the circumferential direction extends three hundred sixty degrees (360°) around the axis of rotation 12.

The hybrid-electric gas turbine engine 10 includes, in downstream serial flow relationship, a fan section 18 including a fan assembly 20, a compressor section 22 including a booster or low-pressure (LP) compressor 24 and a high-pressure (HP) compressor 26, a combustion section 28 including a combustor 30, a turbine section 32 including a HP turbine 34, and a LP turbine 36, and an exhaust section 37. A turbine core 38 can be defined by the compressor section 22, the combustion section 28, the turbine section 32, and the exhaust section 37. The HP compressor 26 and HP turbine 34 can be drivingly coupled via a rotatable HP shaft 48 (e.g., a high-speed shaft) to define an HP spool 27. The LP compressor 24 and LP turbine 36 can be drivingly coupled via a rotatable LP shaft 56, (e.g., a low-speed shaft), to define an LP spool 25. The HP shaft 48 and the LP shaft 56 can be disposed coaxially about the hybrid-electric gas turbine engine axis of rotation 12. Additionally, the LP shaft 56 can be disposed within a larger diameter annular HP shaft 48, to drivingly connect the LP turbine 36 to the LP compressor 24 and fan assembly 20.

The fan section 18 includes a tubular fan casing 40 surrounding the fan assembly 20. The fan casing 40 can define an annular air inlet 41. The fan assembly 20 includes a plurality of fan blades 42 disposed radially about the hybrid-electric gas turbine engine axis of rotation 12. Fan supports 43 can include, by way of non-limiting example, one or more of rotatable or non-rotatable stabilizers, bearings, sensors, or connecting shafts.

The HP compressor 26, the combustor 30, and the HP turbine 34 form an engine core 44. The turbine core 38, which can include the engine core 44, can be surrounded by a tubular core casing 46. The core casing 46 can be disposed coaxially about the axis of rotation 12. In non-limiting aspects, the core casing 46 can be considered to enclose the compressor section 22, the combustion section 28, the turbine section 32. The core casing 46 can define an annular core air inlet 17. The core casing 46 can enclose and support the LP compressor 24 for pressurizing air that enters through the core air inlet 17. In some aspects, the core casing 46 can be coupled with the fan casing 40.

The compressor section 22 and turbine section 32 can have multiple respective stages, with the stages comprising respective pairs of blades and vanes. More specifically, the LP compressor 24 and the HP compressor 26 respectively include a set of compressor stages 64, 68, in which a set of compressor blades 70, 72 can rotate relative to a corresponding set of static compressor vanes 74, 76, (e.g., a nozzle), to compress or pressurize the stream of fluid passing through the stage. In a single compressor stage 64, 68, multiple compressor blades 70, 72 can be provided in a ring and can extend radially outwardly relative to the hybrid-electric gas turbine engine axis of rotation 12, from a blade platform to a blade tip, while the corresponding static compressor vanes 74, 76 are positioned upstream of and adjacent to the rotating compressor blades 70, 72. The compressor vanes 74, 76 can comprise an airfoil body having a chord, camber, and other elements typical to an airfoil. A radially inward portion of the vanes 74, 76 can include a seal having a rub element 79 and a set of seal teeth 53 disposed adjacent to rub element 79. The seal teeth 53 can be slightly spaced from the rub element 79 such that a seal teeth clearance 81 is disposed between the radial extent of the seal teeth 53 and the rub element 79. The seal teeth clearance 81 can permit a volume of air to flow between the seal teeth 53 and the rub element 79. It is noted that the number of blades, vanes, and compressor stages shown in FIG. 1 were selected for illustrative purposes only, and that other numbers are possible.

The compressor blades 70, 72 for a stage of the compressor can be mounted to a disk 58, which is mounted to the corresponding one of the HP and LP shafts 48, 56, with each stage having its own respective disk 58. In some aspects, the compressor blades 70, 72 may be part of a blisk, rather than being mounted to a disk. The vanes 74, 76 for a stage of the compressor can be mounted to the core casing 46 in a circumferential arrangement.

The combustor 30 can define an annular combustion chamber 35 that is generally coaxial with the axis of rotation 12. The combustor 30 can further include a fuel nozzle 33 arranged in fluid communication with the combustion chamber 35. An igniter (not shown) can provide for ignition of the fuel and air within the combustion chamber in a known manner. An exhaust outlet (not shown) can be configured to allow exit of combustion gases 39 from the combustion chamber 35 in an axial direction.

The HP turbine 34 and the LP turbine 36 respectively include a plurality of turbine stages 78, 80, in which a set of turbine blades 82, 84 are rotated relative to a corresponding set of static turbine vanes 86, 88, to extract energy from the stream of fluid passing through the stage. The HP turbine blades 82 for a stage of the turbine can be mounted to the HP shaft 48. The LP turbine blades 84 for a state of the turbine can be mounted to the LP shaft 56. In a single turbine stage 78, 80, multiple turbine blades 82, 84 can be provided in a ring and can extend radially outwardly relative to the hybrid-electric gas turbine engine axis of rotation 12, from a blade platform at a radially inner end of the turbine blades 82, 84 to a blade tip 85, 87 at a radially outer end of the turbine blades 82, 84, while the corresponding static turbine vanes 86, 88 are positioned upstream of and adjacent to the rotating blades 82, 84. The turbine vanes 86, 88 can be mounted to the core casing 46 in a circumferential arrangement.

A first gap or HP turbine blade tip clearance 75 can be defined between the blade tips 85 of the HP turbine blades 82 and a radially inward surface of the core casing 46. A second gap or LP turbine blade tip clearance 77 can be defined between the blade tips 87 of the LP turbine blades 84 and the radially inward surface of the core casing 46.

Complementary to the rotor portion, the stationary portions of the hybrid-electric gas turbine engine 10, such as the static vanes 74, 76, 86, 88 among the compressor section 22 and turbine section 32 are also referred to individually or collectively as an outer rotor/stator. As illustrated, the outer rotor/stator can refer to the combination of non-rotating elements throughout the hybrid-electric gas turbine engine 10. Alternatively, the outer rotor/stator that circumscribes at least a portion of the inner rotor/stator, can be designed to rotate. The inner or outer rotor/stator can include at least one component that can be, by way of non-limiting example, a shroud, vane, nozzle, nozzle body, combustor, hanger, or blade, where the at least one component is a plurality of circumferentially arranged component segments having confronting pairs of circumferential ends.

The hybrid-electric gas turbine engine 10 can further include a first electric machine 51 (e.g., a first motor-generator 51) and a second electric machine 52 (e.g., a second motor-generator 52). The first electric machine 51 can be rotatably coupled to the HP shaft 48, and the second electric machine 52 can be rotatably coupled to the LP shaft 56. The first and second electric machines 51, 52 can be selectively electrically coupled to one or more electrical power source 120 (shown in FIG. 2), such as an inverter. The first and second electric machines 51, 52 can be selectively electrically coupled to a set of electrical loads 131 (shown in FIG. 2) such as a respective battery bank or resistive load. Although FIG. 1 depicts the first and second electric machines 51, 52 as being operatively coupled to the HP shaft 48 and LP shaft 56, respectively, at a fore end of the hybrid-electric gas turbine engine, the first and second electric machines 51, 52 can be disposed at any suitable location.

The first and second electric machines 51, 52 can each be one or more of a starter, a starter generator, a generator, a motor, a motor-generator, or a combination thereof. The first and second electric machines 51, 52 can include one or more devices that use electromagnetic forces and can include at least one respective drive shaft. It is further contemplated that the first and second electric machines 51, 52 can include any number of gears, shafts, transformers, magnetics, brushes, induction devices, or other electrical or mechanical elements.

In the illustrated example, the first electric machine 51 has a rotatable first input/output shaft 49 rotatably coupled to the HP shaft 48, and the second electric machine 52 has a rotatable second input/output shaft 59. The HP shaft 48 can couple the HP turbine 34 to the first input/output shaft 49 and the LP shaft 56 can connect the LP turbine 36 to the second input/output shaft 59. In non-limiting aspects, the first and second electric machines 51, 52 can be selectively coupled to the HP and LP shafts 48, 56 via a first clutch 50 and a second clutch 60, respectively Additionally, or alternatively, it is contemplated that the first electric machine 51 can further include a first gearbox (not shown) and the second electric machine 52 can include a second gearbox (not shown). The first gearbox can couple the first input/output shaft 49 to the HP shaft 48 or the first clutch 50 where the first clutch 50 selectively engages the HP shaft 48. The second gearbox can couple the second input/output shaft 59 to the LP shaft 56 or the second clutch 60 where the second clutch 60 selectively engages the LP shaft 56. In other non-limiting aspects, the either the first or second clutch 50, or the first or second gearbox, or combinations thereof can be omitted.

While FIG. 1 depicts the first and second electric machine 51, 52 selectively rotatably coupled to the HP and LP shafts 48, 56, other aspects are not so limited, and the first and second electric machine 51, 52 can be fixedly or permanently rotatably coupled to the HP and LP shafts 48, 56 respectively. The rotatable coupling between the HP shaft 48 and the first electric machine 51, and the rotatable coupling between the LP shaft 56 and the second electric machine 52, can thus be permanent including rotatably permanent.

It is contemplated that the HP shaft 48 can be coupled to the first electric machine 51, and the LP shaft 56 can be coupled to the second electric machine 52, at any point or location, including a bottom portion, top portion, or aft side of the first and second electric machine 51, 52, respectively. It is further contemplated that the first electric machine 51 can be located in-line with the HP shaft 48, and the second electric machine 52 can be located in-line with the LP shaft 56.

The first clutch 50 and the second clutch 60 can be a respective over-running clutch that is in direct rotational communication with the first electric machine 51 and second electric machine 52, respectively, to selectively provide an output to the HP shaft 48 and LP shaft 56. Alternatively, the first and second clutch 50, 60 can include any type or combination of clutch mechanisms, such as, but not limited to one or more of a sprag, spring, a roller or ball, a ratchet and pawl clutch, or other known clutches.

As will be described in more detail herein, electrical energy from the first and second electric machines 51, 52 can be selectively communicated to the set of electrical loads 131.

In operation, for example during a cruise mode, an incoming airflow 89 (represented by arrow 89) enters the hybrid-electric gas turbine engine 10 at the fan section 18 through the air inlet 41 defined by the fan casing 40. The incoming airflow 89 passes through the fan blades 42 and is split such that a portion of the airflow is channeled into the LP compressor 24, as a first air flow (represented by arrow 90) through the core air inlet 17. The incoming airflow 89 exits the fan section 18, which then supplies the first airflow 90 as a pressurized first airflow 90 to the HP compressor 26, which further pressurizes the air. A portion 94 of the airflow 89 bypasses the LP compressor 24 and the engine core 44 and exits the hybrid-electric gas turbine engine 10 through a stationary vane row, and, more particularly, an outlet guide vane assembly 96 including a set of airfoil guide vanes 98, at the fan exhaust side 100. More specifically, a circumferential row of radially extending airfoil guide vanes 98 are utilized adjacent the fan section 18 to exert some directional control of the airflow portion 94.

The pressurized first airflow 90 is discharged from the HP compressor 26 into the combustor 30. Fuel can be injected from the fuel nozzle 33 to mix with the first airflow 90 and form a fuel-air mixture provided to the combustion chamber 35 for combustion ignition of the fuel-air mixture can be triggered by the igniter (not shown) thereby generating combustion gases 39. Some work is extracted from these combustion gases 39 by the HP turbine 34, which drives the HP compressor 26. The combustion gases are drivingly discharged into the LP turbine 36, and the exhaust gas is ultimately discharged from the hybrid-electric gas turbine engine 10 via the exhaust section 37 to produce thrust.

A portion of the pressurized first airflow 90 can be drawn from the compressor section 22 as bleed air 92. The bleed air 92 can be drawn from the pressurized first airflow 90 and provided to engine components requiring cooling. The temperature of pressurized first airflow 90 entering the combustor 30 is significantly increased. As such, cooling provided by the bleed air 92 is necessary for operating of such engine components in the heightened temperature environments. Some of the air supplied by the fan assembly 20 can bypass the engine core 44 and be used for cooling of portions, especially hot portions, of the hybrid-electric gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Based on the rotatable coupling between the HP and LP shafts 48, 56 to the first and second input/output shafts 49, 59, respectively, when a portion of the first or second electric machine 51, 52 is rotating, then the HP or LP shafts 48, 56 rotate. Conversely, when the HP or LP shafts 48, 56 rotate, then at least a portion of the first or second electric machines 51, 52, respectively, rotate. Therefore, in operation, the first electric machine 51 can drive the HP shaft 48 by providing a rotatable output or torque to the HP shaft 48 via the first input/output shaft 49, and the second electric machine 52 can drive the LP shaft 56 by providing a rotatable output or torque to the LP shaft 56 via the second input/output shaft 59. Alternatively, the first electric machine 51 can receive a rotatable input or torque from the first input/output shaft 49, and the second electric machine 52 can receive a rotatable input or torque from the second input/output shaft 59 for the generation of electrical energy.

In an aspect, and as will be described in more detail herein, the first electric machine 51, or the second electric machine 52, or both, can be respectively configured to selectively operate in one of a motor mode and a generator mode. For example, the first and second electric machines 51, 52 can be arranged receive electrical power to independently operate in a motor mode to provide an output torque to the HP and LP shafts 48, 56 via the first and second input/output shafts 49, 59, for example to start the engine, or to provide additional thrust to the HP and LP shafts 48, 56 when needed. That is, rotation of the first or second electric machine 51, 52 can cause the first or second electric machine 51, 52 to provide torque to the HP or LP shafts 48, 56, respectively, such that a rotational speed of the HP or LP shaft 48, 56 is changed (e.g., increased) thereby changing a thrust provided by the hybrid-electric gas turbine engine 10. The rotational speed of the HP shall 48 and LP shaft 56 can be changed (e.g., increased) independent of the other of the HP or LP shaft 48, 56. Alternatively, the first and second electric machines 51, 52 can selectively receive an input torque from the HP and LP shafts 48, 56, via the first and second input/output shafts 49, 59 respectively, and operate in a generator mode to generate electrical power utilizing the rotational energy of the HP or LP shaft 48, 56, for example to provide an electrical output to the electrical load 131. In such instances, rotation of the first or second electric machine 51, 52 by the HP or LP shafts 48, 56, respectively, provides a drag or rotational load on the HP or LP shafts 48, 56, respectively, such that a rotational speed of the HP or LP shaft 48, 56 is changed (e.g., decreased) thereby changing a thrust provided by the hybrid-electric gas turbine engine 10. The rotational speed of the HP shaft 48 and LP shaft 56 can be changed (e.g., increased or decreased) independent of the other of the HP or LP shaft 48, 56.

Figure 2:
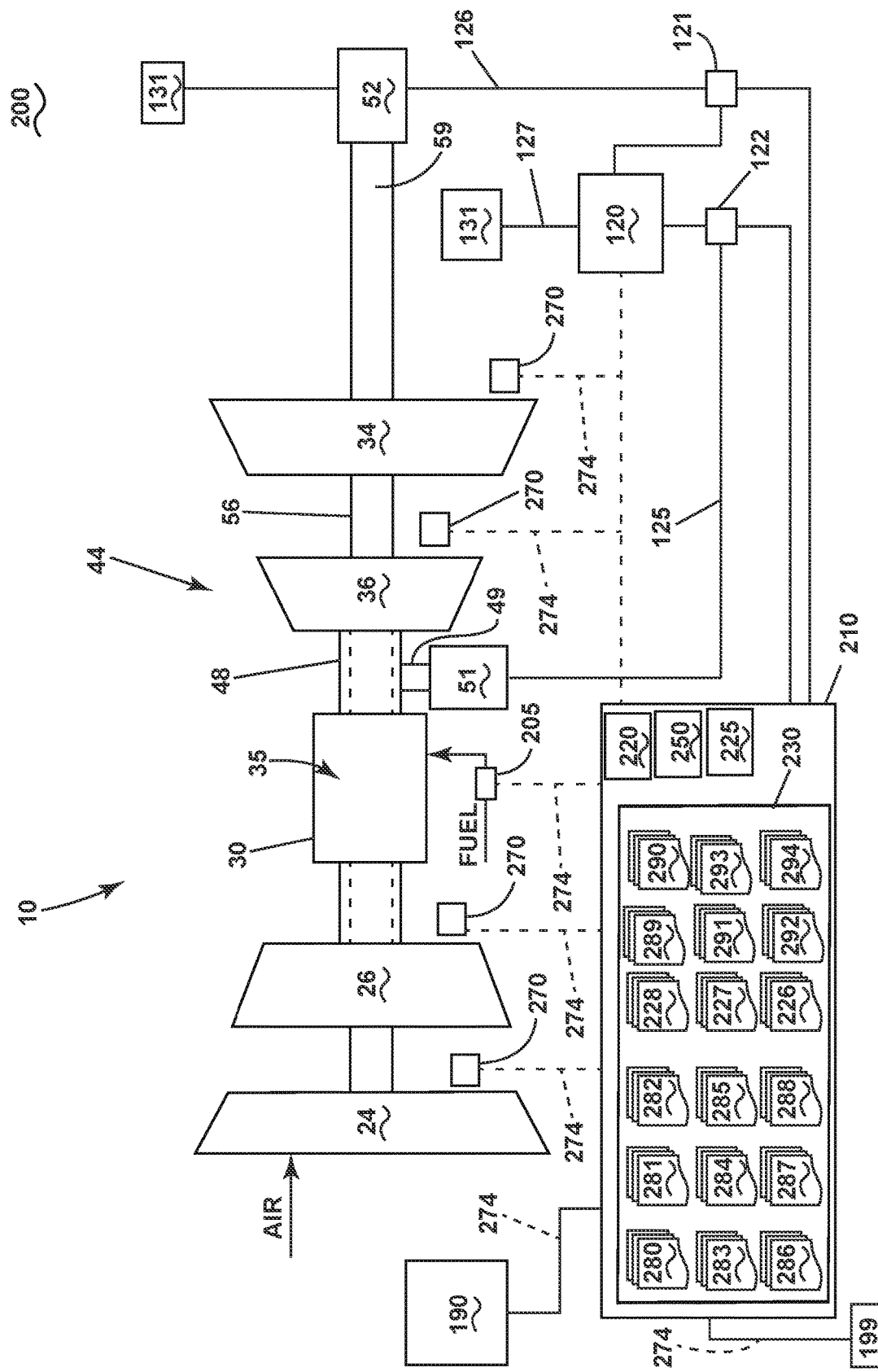
FIG. 2 is a schematic illustration of a control system for controlling an operation of the exemplary hybrid-electric gas turbine engine of FIG. 1, according to aspects of the present disclosure.

FIG. 2 is a schematic illustration of an aspect of a control system 200 for the exemplary hybrid-electric gas turbine engine 10 of FIG. 1. The control system 200 is operable to control an operation of the hybrid-electric gas turbine engine 10. As illustrated, the hybrid-electric gas turbine engine 10 can also include one or more fuel control devices 205 operable to control fuel flow to the hybrid-electric gas turbine engine 10, and more particularly, to the combustion chamber 35 of the combustor 30. The fuel control device 205 can be communicatively coupled with the control system 200, e.g., via a suitable wired or wireless communication link. As illustrated, the hybrid-electric gas turbine engine and control system 200 can be communicatively coupled with one or more thrust input devices 190, such as power or thrust levers movable by a user (e.g., a pilot). The one or more thrust input devices 190 can provide an input signal to the control system indicative of a change in the thrust demand. The one or more thrust input devices 190 can be located at any desired location (e.g., a cockpit) and can include a flight control system 199 (e.g., an autopilot system, not shown) operable to automatically change the thrust demand to the hybrid-electric gas turbine engine 10.

The control system 200 can be disposed in any suitable location, such as onboard the hybrid-electric gas turbine engine 10, or in a cockpit of a vehicle powered by the hybrid-electric gas turbine engine 10. In some aspects, some or all of the components of the control system 200 can be disposed onboard the hybrid-electric gas turbine engine 10 or offboard the hybrid-electric gas turbine engine 10. The control system 200 can be communicatively coupled to a set of sensors 270 disposed on the hybrid-electric gas turbine engine 10.

The control system 200 can include a control module 210, one or more electrical power source 120, a first electrical control device 121 and a second electrical control device 122. For instance, the first and second electrical control devices 121, 122 can comprise a set of inverters, converters, variable frequency drives (VFD), rectifiers, devices operable to control the flow of electrical current, etc., and combinations thereof. Although the first and second electrical control device 121, 122 are shown schematically in FIG. 2 as separate from the electrical power source 120, and separate from the first and second electric machine 51, 52, it will be appreciated that one or both of first and second electrical control device 121, 122 can be located onboard the electrical power source 120 and/or the first and second electric machine 51, 52.

The control module 210 can include a computing device a processor 220, a memory 230, and a communications module 250. In some non-limiting aspects, the control module 210 can include a thrust demand scheduler 225. Additionally, or alternatively, a set of thrust demand schedules 226 can be stored in the memory 230. The processor 220 can be configured to perform a variety of computer-implemented functions and/or instructions (e.g., performing the methods, steps, calculations and the like and storing relevant data as disclosed herein). The instructions, when executed by the processor, can cause the processor 220 to perform operations, as described herein. The control module 210 can be communicatively coupled to the first electrical control device 121 and the second electrical control device 122 to control an operation thereof.

The control module 210 can be a system of controllers or a single controller. The control module 210 can be a controller dedicated to control of an operation of the hybrid-electric gas turbine engine 10 and associated electrical components, or can be an engine controller configured to control the hybrid-electric gas turbine engine 10 and its associated electrical components. The control module 210 can be, for example, an Electronic Engine Controller (EEC) or an Electronic Control Unit (ECU) of a Full. Authority Digital Engine Control (FADEC) system.

The first and second electric machines 51, 52 can be selectively electrically coupled with the one or more electrical power source 120, e.g., via a first power bus 125, and a second power bus 126. The first and second electric machines 51, 52 can be further selectively electrically coupled with set of electrical loads 131, e.g., via a second power bus 127. The first and second electric machines 51, 52 can be configured to receive electrical power from the one or more electrical power source 120. The one or more electrical power source 120 can be any suitable power source. For example, the one or more electrical power source 120 can be, without limitation, one or more energy storage device (e.g., one or more batteries), electric generator, auxiliary power unit WU), photovoltaic panel, DC power supply, AC power supply, or any other known source of electrical power, or a combination thereof. The one or more electrical power source 120 can be located onboard the hybrid-electric gas turbine engine 10, or mounted or positioned offboard of the hybrid-electric gas turbine engine 10.

The set of electrical loads 131 can include for example, without limitation, a battery bank, lighting, pump, heater, instrument, radio, flap, landing gear, or other systems or operative structures.

The set of sensors 270 can include one or more sensors for sensing, measuring, detecting, and/or monitoring various engine operating conditions or parameters during operation. For instance, one or more sensors 270 can be positioned at the LP compressor 24, one or more sensors 270 can be positioned at the HP compressor 26, one or more sensors 270 can be positioned at the I-EP turbine 34, and one or more sensors 270 can be positioned at the LP turbine 36, among other possible locations. The sensors 270 can sense or measure various engine conditions, e.g., pressures and temperatures, and one or more signals may be provided from the set of sensors 270 to the control module 210 for processing. The control module 210 can be communicatively coupled with the set of sensors 270, via a suitable wired or wireless communication link. It will be appreciated that the hybrid-electric gas turbine engine 10 can include any number of sensors at other suitable stations along the core air flow path.

The communications module 250 can be configured to facilitate communications between the control module 210 and various components of hybrid-electric gas turbine engine 10 and associated components and controls, such as the flight control system 199. The communications module 250 can include a sensor interface (e.g., one or more analog-to-digital converters) to permit signals transmitted from the set of sensors 270 to be converted into signals that can be understood and processed by the processor 220. It should be appreciated that the sensors 270 can be communicatively coupled to the communications module 250 using any suitable means. For example, the sensors 270 can be coupled to the communications module 250 via a wired connection, or a wireless connection, such as by using any suitable wireless communications protocol. As such, the processor 220 can be configured to receive one or more signals or outputs from the sensors 270, such as one or more operating conditions, parameters, or measurements and the like.

In operation, the hybrid-electric gas turbine engine 10 is operable to produce propulsive thrust (e.g., for an aerial vehicle). A user, such as a pilot, can initiate a change in the thrust (i.e., a thrust demand) output of the hybrid-electric gas turbine engine 10 for example, via the thrust input device 190. The change in thrust demand can be an increase in thrust demand or a decrease in thrust demand. For instance, to perform a step climb during cruise operation, a pilot can operate the thrust input device 190 to increase the power level and consequently change the thrust demand to the hybrid-electric gas turbine engine 10. It will be appreciated that the change in thrust demand can correlate to a change in the rotational speed of the HP shaft 48 or LP shaft 56 or both. The change in the rotational speed of the HP shaft 48 and LP shaft 56 can be an acceleration or a deceleration.

The control module 210 can receive one or more inputs 274. The inputs 274 can be in the form of analog or digital electrical signals. For example, the control module 210 can receive an input 274 from the thrust input device 190, or the flight control system 199, indicative of the change in thrust demand. Additionally, the control module 210 can receive one or more inputs 274 indicative of one or more operating conditions or parameters of the hybrid-electric gas turbine engine 10. The control module 210 can receive the one or more inputs from one or more sensors 270, via a user input, from control logic operable to calculate the value of the parameters or conditions based at least in part on the received sensor outputs, from one or more models, or automatically based on commands from a flight control system 199, and various combinations thereof.

For example, in non-limiting aspects, the operating conditions and parameters that can be sensed, calculated, and/or modeled include, without limitation, a HP turbine blade tip clearance, a LP turbine blade tip clearance, a fan blade tip clearance, a seal tooth clearance, an altitude, an ambient temperature, an exhaust gas temperature, a compressor discharge temperature, an inlet low-pressure compressor temperature, a specific fuel consumption, an engine efficiency, a Mach number, a thrust, an airspeed, a fan flow, a core flow, a current electrical current draw of the first and second electric machines 51, 52, a fan speed, a core speed, an engine inlet pressure, a bypass passage pressure, an inlet high-pressure compressor pressure, a compressor discharge pressure, a high-pressure turbine pressure, an accelerometer measurement, a flight control position, and/or one or more waypoints of a mission (e.g., the origin, the destination, and one or more points therebetween), and the like.

In response to the change in thrust demand, or the one or more inputs 274 received by the control module 210, or a combination thereof, the control module 210 can determine a rate of change of thrust attributable to combustion in the combustor 30, and another rate of change of thrust attributable to the first electric machine 51, or the second electric machine 52, or various combinations thereof, to cooperatively satisfy the change in thrust demand. For example, in non-limiting aspects, in response to the one or more inputs 274 received by the control module 210, the thrust demand scheduler 225 can determine or generate a respective thrust demand schedule 226. As will be understood, each thrust demand schedule 226 can define a schedule of fuel flow to the combustor 30 over a predetermined time period, and a schedule of electrical current flow to the first and second electric machines 51, 52 over the time period. That is, in non-limiting aspects, the thrust demand schedule 226 can include a fuel flow schedule 227 and an electric current schedule 228. The control module 210 can control fuel flow to the combustor 30 over the time period based at least in part on the determined fuel flow schedule 227 and control electrical current flow to the first and second electric machines 51, 52 over the time period based at least in part on the electric current schedule 228 in this way, the thrust demand schedule 226 can define a portion of thrust, or rate of change of thrust, or both, attributable to combustion in the combustor 30, and another portion of thrust, or rate of change of thrust, or both, attributable to at least one of the first and second electric machines 51, 52. The thrust demand schedule 226 is determined by the thrust demand scheduler 225 so that, when the thrust demand schedule 226 is implemented, the thrust demand is satisfied or substantially met.

In some non-limiting aspects, a set of thrust demand schedules 226 can be predetermined and saved to memory 230. Additionally, or alternatively, determining the thrust demand schedule 226 can comprise selecting a predetermined thrust demand schedule from memory 230. Alternatively, determining the thrust demand schedule 226 can comprise modifying a predetermined thrust demand schedule, or calculating a thrust demand schedule during operation.

Based at least on the thrust demand schedule 226, the control module 210 can operate or control an operation of the first electrical control device 121 and the second electrical control device 122. The first electrical control device 121 can be operable to control the electrical power provided to the first electric machine 51 from the at least one electrical power source 120. The second electrical control device 122 can be operable to control the electrical power provided to the second electric machine 52 from the at least one electrical power source 120. The first and second electrical control devices 121, 122 can be further operable to condition and/or convert electrical power (e.g., from AC to DC or vice versa) provided to the first and second electric machines 51, 52.

The control module 210 can further control the first and second electric machines 51, 52 to selectively operate in one of the motor mode and the generator mode. The first and second electric machines 51, 52 can be selectively operated in the motor mode in response to the electrical power received from the at least one electrical power source 120. Alternatively, the first and second electric machines 51, 52 can be selectively operated in the generating mode in response to a rotation of the HP and LP shafts 48, 56 coupled to the first and second electric machines 51, 52.

For example, to selectively operate the first and second electric machines 51, 52 in the motor mode, the control module 210 can be configured to control the first electrical control device 121 and the second electrical control device 122 to selectively provide electrical power to the first or second electric machines 51, 52 via the first and second power bus 125, 126 or both. Conversely, to selectively operate the first and second electric machines 51, 52 in the generator mode, the control module 210 can be configured to control the first electrical control device 121 and the second electrical control device 122 to selectively cease providing electrical power to the first and or second electric machines 51, 52 during a rotation of the HP shaft 48 or LP shaft 56.

When operating in the motor mode, the first and second electric machines 51, 52 can independently provide a torque to the HP and LP shafts 48, 56 via the first and second input/output shafts 49, 59. Conversely, when operating in the generator mode, the first and second electric machines 51, 52 can receive a torque from the HP and LP shafts 48, 56, via the first and second input/output shafts 49, 59, respectively, and provide an electrical output to set of electrical loads 131.

More specifically, when operating in the motor mode, the energy suppled to the first and second electric machines 51, 52 (e.g., from the first and second electrical control devices 121, 122) rotates one or more respective components of the first and second electric machines 51, 52 resulting in a rotation of the respective first or second input/output shaft 49, 59. Since the first and second input/output shafts 49, 59 are coupled to the HP shaft 48 and LP shaft 56, respectively, the first and second electric machines 51, 52 can provide a torque to rotate the HP shaft 48 and LP shaft 56. The rotation of the HP shaft 48 rotates the respective blades 72, 82 of the HP compressor 26 and HP turbine 34. The rotation of the LP shaft 56 results in the rotation of the respective blades 70, 84 of the LP compressor 24 and the LP turbine 36. Conversely, when operating in the generator mode, the electrical power suppled to the first and second electric machines 51, 52 (e.g., from the first and second electrical control devices 121, 122) can be cut off. Since the first and second input/output shafts 49, 59 are coupled to the rotating HP shaft 48 and LP shaft 56, respectively, the rotating HP shaft 48 and LP shaft 56 can drive a rotation of the first and second electric machines 51, 52.

For example, in one non-limiting instance, a particular hybrid-electric gas turbine engine 10 can be powering an aircraft (not shown) during a cruise mode of a flight, with one of the first and second electric machines 51, 52, or both, operating in the motor mode, (e.g., having stator terminals (not shown) electrically coupled to the electrical source 120, with a rotor rotating in the direction of a stator rotating magnetic field) to provide torque to the HP shaft 48 or LP shaft 56, or both. In the event of a change in a thrust demand, wherein a rapid rate of acceleration the one of the HP shaft 48 or LP shaft 56, or both, is desired to satisfy the increase in thrust demand, based on operating parameters, additional electrical power can be provided to one of the first and second electric machines 51, 52, or both, to provide additional torque to the HP shaft 48 or LP shaft 56, or both. The additional torque can supplement the torque provided by the exhaust gasses from the combustor 30. Alternatively, in another non-limiting instance of a change in a thrust demand, wherein, based on operating parameters, one of a deceleration, or a slower or more gradual rate of acceleration the one of the HP shaft 48 or LP shaft 56, or both, is desired to satisfy the increase in thrust demand, one of the first and second electric machines 51, 52, or both, can be operated in the generator mode, to provide an electrical output to the set of electrical loads 131, while simultaneously applying a drag or rotational load to the HP shaft 48 or LP shaft 56, or both. In this way, the first and second electric machines 51, 52 can be independently controlled to optimize (e.g., increase or decrease an acceleration or deceleration) the HP shaft 48 or LP shaft 56, particularly during transient load conditions.

In operation, in the event of a change in the thrust demand of the hybrid-electric gas turbine engine 10, the control module 210 can be configured to calculate or determine a portion of thrust, or a rate of change of thrust, or both, attributable to combustion in the combustor 30, and further calculate or determine another portion of thrust or a rate of change of thrust, or both, attributable to the first electric machine 51, or the second electric machine 52, or both, to cooperatively to satisfy the change in thrust demand.

For example, the control module 210 can determine a first rate of change 280 of thrust attributable to combustion in the combustor 30, and a nominal second rate of change 281 of thrust attributable to the first electric machine 51. As will be appreciated, the nominal second rate of change 281 of thrust can be correlated to an acceleration or a deceleration of the rotational speed of the HP shaft 48. As will be described in more detail herein, in non-limiting aspects, the control module 210 can additionally calculate an optimized third rate of change 289 of thrust attributable to the first electric machine 51, (e.g., an acceleration or deceleration in the rotational speed of the HP shaft 48) based on the change in the thrust demand and other inputs 274 to the control module 210. Additionally, or alternatively, in non-limiting aspects, in the event of a change in the thrust demanded of the hybrid-electric gas turbine engine 10, the control module 210 can be configured to calculate or determine a nominal fourth rate of change 282 of thrust attributable to the second electric machine 52. As will be appreciated, the nominal fourth rate of change 282 of thrust can be correlated to an acceleration or a deceleration of the rotational speed the LP shaft 56. As will be described in more detail herein, the control module 210 can additionally calculate an optimized fifth rate of change 290 of thrust attributable to the second electric machine 52 (e.g., an acceleration or deceleration of the rotational speed of the LP shaft 56 based on the change in the thrust demand and other inputs 274 to the control module 210. In non-limiting aspects, the control module 210 can calculate or determine the nominal second rate of change 281, or the nominal fourth rate of change 282, based on one or more of the determined thrust demand schedule 226, the one or more inputs to the control module 210, data saved in memory 230, or a combination thereof.

As noted above, in some aspects, the one or more inputs 274 to the control module 210 can include one or more values indicative of one or more current clearances, for example a current first clearance, such as a current HP turbine blade tip clearance 283, a current second clearance such as a current LP turbine blade tip clearance 284, a current third clearance such as a seal tooth clearance 81, and the like, or combinations thereof. It should be appreciated that while aspects are described herein, for ease of description and understanding, with reference to various exemplary clearances such as the current HP turbine blade tip clearance 283, current LP turbine blade tip clearance 284, or current seal tooth clearance 81, other aspects are not so limited. Other non-limiting aspects can be implemented using any other desired clearance or parameter without departing from the scope of the disclosure.

The control module 210 can compare the one or more values indicative of the current HP turbine blade tip clearance 283, the current LP turbine blade tip clearance 284, or seal tooth clearance 81 or combinations thereof, with a reference value 293. In non-limiting aspects, the reference value 293 can comprise a first desired clearance 285 such as a predetermined first desired clearance 285 of the HP turbine blade tip clearance, or a second desired clearance 286 such as a predetermined second desired clearance of 286 of the LP turbine blade tip clearance, or both. The predetermined first desired clearance 285 or the predetermined second desired clearance 286, or both, can be based on inputs 274 to the control module 210 indicative of the value of predetermined operating conditions or parameters, data saved in the memory 230, or calculated values, or combinations thereof. The predetermined first desired clearance 285, or the predetermined second desired clearance 286, or both can be saved to the memory 230.

Based on the comparison of the one or more values indicative of the current HP turbine blade tip clearance 283 with the predetermined first desired clearance 285, the control module 210 can be configured to determine a difference between the current HP turbine blade tip clearance 283 and the predetermined first desired clearance 285, to define a first differential value 287. Additionally, or alternatively, based on the comparison of the one or more values indicative of the current LP turbine blade tip clearance 284, with the predetermined second desired clearance 286, the control module 210 can be configured to determine a difference between the current LP turbine blade tip clearance 284 and the predetermined second desired clearance 286, to define an LP turbine blade tip clearance second differential value 288. The first and second differential values 287, 288 can be saved to memory 230. It is contemplated that the first and second differential values 287, 288 in various instances can have a positive value, a negative value, or a value of zero.

The control module 210 can determine if the first differential value 287 satisfies a predetermined first differential threshold 291. The predetermined first differential threshold 291 can be saved in memory 230. In the event that the first differential value 287 satisfies the predetermined first differential threshold 291, the control module 210 can be configured to execute the thrust demand schedule 226 in accordance with the nominal second rate of change 281.

In the event that the first differential value 287 does not satisfy the predetermined first differential threshold 291, the control module 210 can calculate or determine the optimized third rate of change 289 of thrust attributable to the first electric machine. The optimized third rate of change 289 can be different from the nominal second rate of change 281. More specifically, regardless of whether the current change in the thrust demand calls for, or results in, an acceleration or deceleration of the rotational speed of the HP shaft 48, the optimized third rate of change 289 can be greater than, or lesser than, the nominal second rate of change 281. The optimized third rate of change 289 can be based on the first differential value 287 and the nominal second rate of change 281. The control module 210 can be configured to execute the thrust demand schedule 226 in accordance with the optimized third rate of change 289.

Alternatively, in non-limiting aspects, in the event that the optimized third rate of change 289 is greater than the nominal second rate of change 281, the control module 210 can be configured to provide electrical power to control the first electric machine 51 in a motor mode, to apply a torque to the HP shaft 48. Conversely, in non-limiting aspects, in the event that the optimized third rate of change 289 is less than the nominal second rate of change 281, the control module 210 can be configured to reduce or cut off electrical power to the first electric machine 51, to operate the first electric machine 51 in a generator mode, that is, to apply a drag or rotational load on the HP shaft 48.

The control module 210 can also determine if the second differential value 288 satisfies a predetermined second differential threshold 292. The predetermined second differential threshold 292 can be saved in memory 230. In the event that the second differential value 288 satisfies the predetermined second differential threshold 292, the control module 210 can be configured to execute the thrust demand schedule 226 in accordance with nominal fourth rate of change 282.

Alternatively, in the event that the second differential value 288 does not satisfy the predetermined second differential threshold 292, the control module 210 can calculate or determine an optimized fifth rate of change 290 in the second rotational speed of the LP shaft 56. The optimized fifth rate of change 290 can be different from the nominal fourth rate of change 282. More specifically, regardless of whether the current change in the thrust demand calls for, or results in, an acceleration or deceleration of the rotational speed of the LP shaft 56, the optimized fifth rate of change 290 can be greater or lesser than the nominal fourth rate of change 282. The optimized fifth rate of change 290 can be based on the second differential value 288 and the nominal fourth rate of change 282.

In non-limiting aspects, in the event that the optimized fifth rate of change 290 is greater than the nominal fourth rate of change 282, the control module 210 can be configured to control the second electric machine 52 in a motor mode, that is, to apply a torque to the LP shat 56. Conversely, in non-limiting aspects, in the event that the optimized fifth rate of change 290 is less than the nominal fourth rate of change 282, the control module 210 can be configured to control the second electric machine 52 in a generator mode, that is, to apply a drag or rotational load on the LP shaft 56.

In this way, the control system 200 can selectively independently control the first and second electric machines 51, 52 to input power to, or, to receive power from, the HP and LP shafts 48, 56 e.g., during change in thrust demand, to optimize a rate of change of thrust attributable to the HP and LP shafts 48, 56 based on current operational conditions such as a clearance, for example an HP or LP turbine tip clearance, or a seal tooth clearance, and the like.

Figure 3:
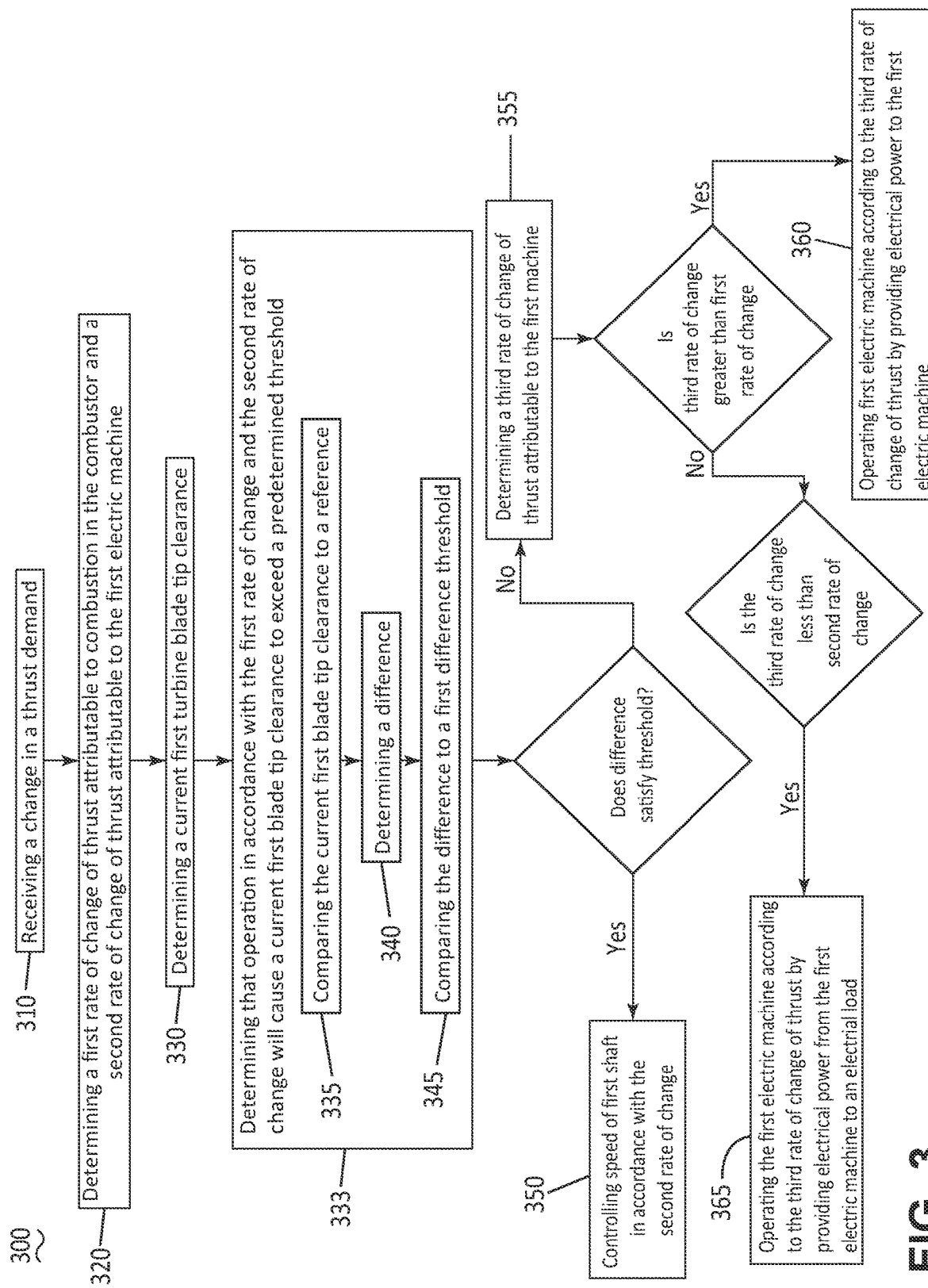
FIG. 3 is flow diagram illustrating a method of controlling an operation of a hybrid-electric gas turbine engine according to aspects of the present disclosure.

FIG. 3 provides a flow diagram of an exemplary method 300 of operating a hybrid-electric gas turbine engine 10 in accordance with exemplary aspects of the present disclosure. For instance, the method 300 is described herein with respect to an operation of the hybrid-electric gas turbine engine 10 of FIGS. 1 and 2 only to describe exemplary aspects of the present subject matter and is not intended to be limiting. In non-limiting aspects, the hybrid-electric gas turbine engine 10 can have the engine core 44 including the core casing 46 enclosing the HP and LP compressors 26, 24, combustor 30, and HP and LP turbines 34, 36, with at least HP and LP spools 27, 25. The HP spool 27 can be defined by the set of HP compressor blades 72 and the set of HP turbine blades 82 coupled to the rotatable HP shaft 48, and the first electric machine 51 rotatably coupled to the HP shaft 48. The LP spool 25 can be defined by the set of LP compressor blades 70 and the set of LP turbine blades 84 rotatably coupled to the LP shaft 56.

At 310, the method 300 includes receiving the input 274 indicative of a change in a thrust demand to the hybrid-electric gas turbine engine 10. The input 274 indicative of a change in a thrust demand can be received by the control module 210. For instance, the control module 210 can receive the input 274 indicative of the change in the thrust demand in response to a user input (e.g., movement of the thrust input device 190), or automatically based on commands or signals from the flight control system 199.

In response to the received input 274 indicative of the change in the thrust demand to the hybrid-electric gas turbine engine 10, the method 300 can include at 320, determining a first rate of change 280 of thrust attributable to combustion in the combustor 30 and a second rate of change 281 of thrust attributable to the first electric machine 51 to cooperatively satisfy the change in thrust demand. For example, in non-limiting aspects, the determining a first rate of change 280 of thrust attributable to combustion in the combustor 30 and a second rate of change 281 of thrust attributable to the first electric machine 51 to cooperatively satisfy the change in thrust demand can include determining the thrust demand schedule 226. The thrust demand schedule 226 can be determined by the thrust demand scheduler 225 so that, when the thrust demand schedule 226 is implemented by the control module 210, the change in thrust demand is met or substantially met. The thrust demand schedule 226 can define a first portion of thrust, or rate of change of thrust, or both, attributable to combustion in the combustor 30, and a second portion of thrust, or rate of change of thrust, or both, attributable to the first electric machine 51. In non-limiting aspects, the thrust demand schedule 226 can include the fuel flow schedule 227 and the electric current schedule 228. The control module 210 can include the thrust demand scheduler 225. The thrust demand scheduler 225 can determine or generate the thrust demand schedule 226. Additionally, or alternatively, a set of thrust demand schedules 226 can be stored in the memory 230 and can be selectable by the control module 210. Additionally, or alternatively, determining the thrust demand schedule 226 can comprise selecting a predetermined thrust demand schedule from memory 230. Alternatively, determining the thrust demand schedule 226 can comprise modifying a predetermined thrust demand schedule 226, or calculating the thrust demand schedule 226 during operation.

The determining a thrust demand schedule can include calculating or determining a nominal second rate of change 281 of thrust attributable to the first electric machine 51. The nominal second rate of change 281 of thrust can be correlated to a first change in the rotational speed (e.g., an acceleration or a deceleration) of the HP shaft 48. In non-limiting aspects, the control module 210 can be configured to calculate or determine the nominal second rate of change 281 of the first rotational speed of the HP shaft 48. In non-limiting aspects, the control module 210 can additionally or alternatively calculate the nominal fourth rate of change 282 of thrust attributable to the LP shaft 56. In various instances, the nominal fourth rate of change 282 can be correlated to a second change in the rotational speed (e.g., an acceleration or a deceleration) of the LP shaft 56. The control module 210 can calculate or determine the nominal second rate of change 281 or the nominal fourth rate of change 282, based on one or more of the determined thrust demand schedule 226, the one or more inputs 274 to the control module 210, data saved in memory 230, or a combination thereof.

Additionally, the method 300 can include, at 330, determining a current first clearance, such as the current HP turbine blade tip clearance 283. In non-limiting aspects, the determining the current HP turbine blade tip clearance 283 can include determining a first value indicative of the current HP turbine blade tip clearance 283. The HP turbine blade tip clearance can define a gap or space between a distal tip of one or more HP turbine blades 82 and the core casing 46. The first value indicative of the current HP turbine blade tip clearance 283 can be determined by the control module 210 based on one or more inputs 274. The one or more inputs 274 to the control module 210 can include one or more measured, calculated, or otherwise determined values indicative of the current HP turbine blade tip clearance 283.

At 333, the method 300 can include determining that operation of the combustor 30 in accordance with the nominal first rate of change 280 of thrust and the first electric machine 52 in accordance with the second rate of change 281 of thrust will cause the current HIP turbine blade tip clearance 283 to exceed the first differential threshold 291. For example, in non-limiting aspects, at 335 the control module 210 can compare the current HP turbine blade tip clearance 283 to the reference value 293 such as the predetermined first desired clearance 285. Non-limiting aspects of the method 300 can include at 340, determining a difference between the current HP turbine blade tip clearance 283 and the predetermined first desired clearance 285, to define a first differential value 287. The control module 210 can be configured to compare the determined first value indicative of the current HP turbine blade tip clearance 283 with the predetermined first desired clearance 285 to define the first differential value 287. The predetermined first desired clearance 285 can be saved to the memory 230. In some aspects, the predetermined first desired clearance 285 can be based on inputs 274 to the control module 210 indicative of the value of operating conditions or parameters, data saved in the memory 230, or calculated values, or combinations thereof. The first differential value 287 can be saved to memory 230. It is contemplated that the first differential value 287 in various instances can have a positive value, a negative value, or a value of zero.

In non-limiting aspects, the method 300 can include at 345, comparing the first differential value 287 to the predetermined first differential threshold 291 to determine if the first differential value 287 satisfies the predetermined first differential threshold 291. The predetermined first differential threshold 291 can be saved in memory 230.

In the event that the first differential value 287 satisfies the predetermined first differential threshold 291, the method 300 can include, at 350, executing the thrust demand schedule 226. The control module 210 can be configured to execute the thrust demand schedule 226 such that the thrust demand is met or substantially met. For example, meeting the thrust demand can include executing the thrust demand schedule 226 in accordance with the nominal second rate of change 281 resulting in a desired rate of change (e.g., an acceleration or a deceleration) of the rotational speed of the HP shaft 48.

In the event that the first differential value 287 does not satisfy the predetermined first differential threshold 291, the method 300 can include at 355, determining the optimized third rate of change 289 of thrust attributable to the first electric machine 51 that will satisfy the change in thrust demand (in cooperation with the first rate of change 280 of thrust), without exceeding the first differential threshold 291. The control module 210 can calculate the optimized third rate of change 289 of thrust. The optimized third rate of change 289 can be different from the nominal second rate of change 281. More specifically, regardless of whether the current change in the thrust demand calls for an acceleration or deceleration of the rotational speed of the HP shaft 48, the optimized third rate of change 289 can be greater or lesser than the nominal second rate of change 281. The optimized third rate of change 289 can be based on the first differential value 287 and the nominal second rate of change 281.

The method 300 can further include, controlling an operation of the first electric machine to control the speed of the HP shaft 48 in accordance with the optimized third rate of change 289. For example, in the event that the optimized third rate of change 289 is greater than the nominal second rate of change 281, the method 300 can include, at 360, controlling the speed of the HP shaft 48 by providing electrical power to the first electric machine 51. The electric power causes the first electric machine 51 to apply torque to the HP shaft 48, causing the HP shaft 48 to increase in rotational speed. In some implementations, the first electric machine 51 applies torque to the HP shaft 48 such that the rotational speed of the HP shaft 48 changes independent of the LP shaft 56.

Conversely, in the event that the optimized third rate of change 289 is less than the nominal first rate of change 280, the method 300 can include, at 365, controlling the speed of the HP shaft 48 by reducing or cutting off electrical power to the first electric machine 51 and providing electrical power from the first electric machine 51 to the set of electrical loads 131. For example, the control module 210 can be configured to control the first electric machine 51 to operate in a generator mode, that is, by ceasing providing electrical power to the first electric machine, while the HP shaft 48 is rotating.

The rotation of the first electric machine 51 by the HP shaft 48 causes the first electric machine 51 to apply a drag or rotational load on the HP shaft 48, causing the HP shaft 48 to decrease in rotational speed, or to increase in rotational speed a slower rate. In some implementations, the first electric machine 51 can applies the drag or rotational load on the HP shaft 48, such that the rotational speed of the HP shaft 48 decreases independent of the LP shaft 56.

Figure 4:
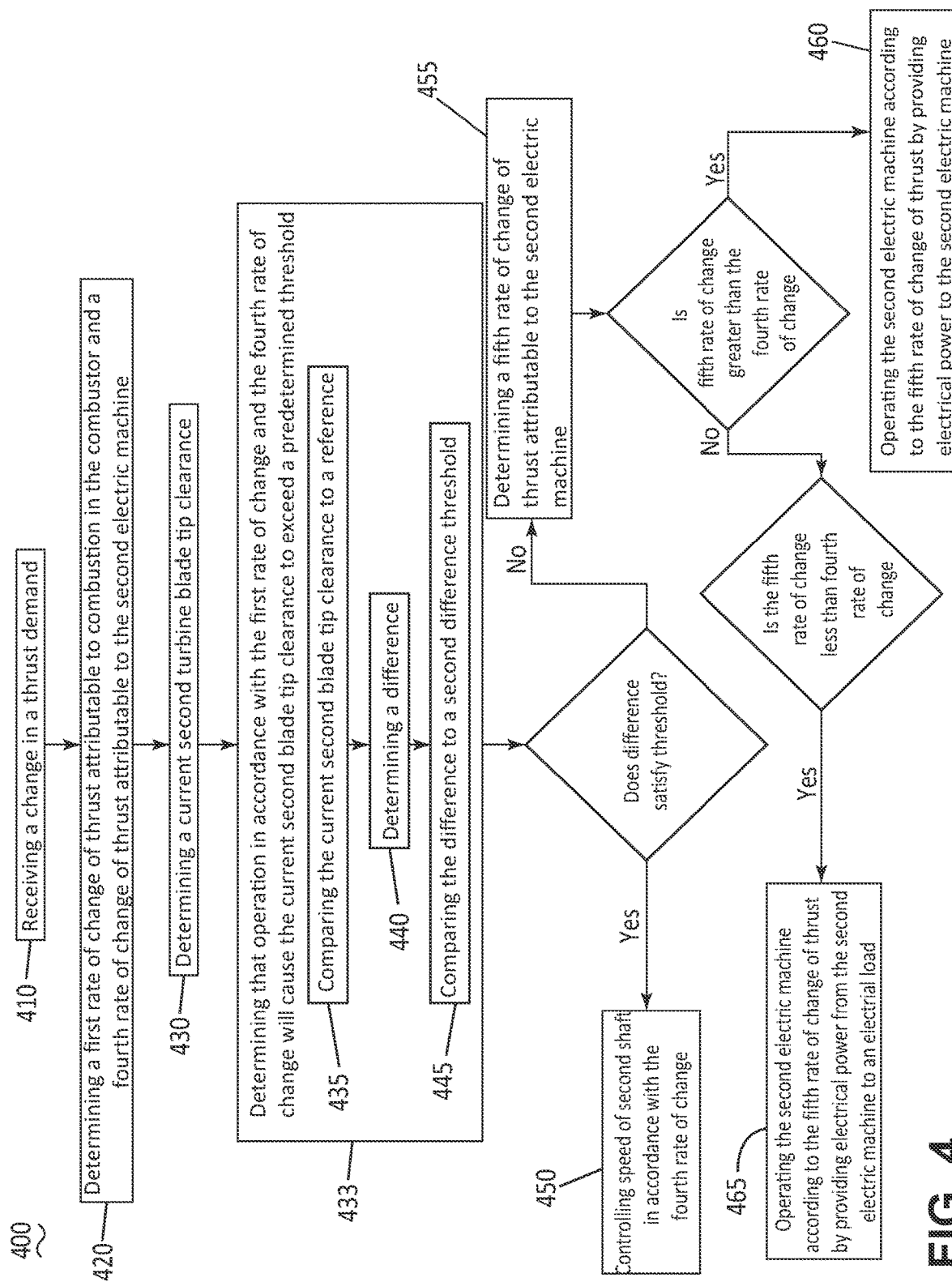
FIG. 4 is flow diagram illustrating another method of controlling an operation of a hybrid-electric gas turbine engine according to aspects of the present disclosure.

FIG. 4 provides a flow diagram of another aspect of an exemplary method 400 of operating a hybrid-electric gas turbine engine 10. For instance, the method 400 can be implemented in conjunction with the method 300 of FIG. 3, or can be implemented independently. FIG. 4 is described herein with respect to an operation of the hybrid-electric gas turbine engine 10 of FIGS. 1 and 2 only to describe exemplary aspects of the present subject matter and is not intended to be limiting.

At 410, the method 400 includes receiving the input 274 indicative of a change in a thrust demand to the hybrid-electric gas turbine engine 10. The input 274 indicative of a change in a thrust demand can be received by the control module 210. For instance, the control module 210 can receive the input 274 indicative of the change in the thrust demand in response to a user input (e.g., movement of the thrust input device 190) or automatically based on commands or signals from the flight control system 199.

At 420, in response to the received input 274 indicative of the change in the thrust demand to the hybrid-electric gas turbine engine 10, the method 300 can include determining the first rate of change 280 of thrust attributable to combustion in the combustor 30 and a fourth rate of change 282 of thrust attributable to the second electric machine 52 to cooperatively satisfy the change in thrust demand. For example, in non-limiting aspects, the determining a first rate of change 280 of thrust attributable to combustion in the combustor 30 and a fourth rate of change 282 of thrust attributable to the second electric machine 52 to cooperatively satisfy the change in thrust demand can include determining the thrust demand schedule 226. The thrust demand schedule 226 can be determined by the thrust demand scheduler 225 so that, when the thrust demand schedule 226 is implemented by the control module 210, the change in thrust demand is met or substantially met. For example, the change in thrust demand can be substantially met within a predetermined range or tolerance value. The thrust demand schedule 226 can define a first portion of thrust, or rate of change of thrust, or both, attributable to combustion in the combustor 30, and a second portion of thrust, or rate of change of thrust, or both, attributable to the second electric machine 52. In non-limiting aspects, the thrust demand schedule 226 can include the fuel flow schedule 227 and the electric current schedule 228. The control module 210 can include the thrust demand scheduler 225. The thrust demand scheduler 225 can determine or generate the thrust demand schedule 226. Additionally, or alternatively, a set of thrust demand schedules 226 can be stored in the memory 230 and can be selectable by the control module 210. Additionally, or alternatively, determining the thrust demand schedule 226 can comprise selecting a predetermined thrust demand schedule from memory 230. Alternatively, determining the thrust demand schedule 226 can comprise modifying a predetermined thrust demand schedule 226, or calculating the thrust demand schedule 226 during operation.

The method 400 can include, at 425, calculating a nominal fourth rate of change 282 of a second rotational speed of the LP shaft 56. In non-limiting aspects, the control module 210 can be configured to calculate or determine the nominal fourth rate of change 282 of the second rotational speed of the LP shaft 56. In various instances, the nominal fourth rate of change 282 of the second rotational speed of the LP shaft 56 can be one of an acceleration or a deceleration. The control module 210 can calculate or determine the nominal fourth rate of change 282, based on one or more of the determined thrust demand schedule 226, the one or more inputs 274 to the control module 210, data saved in memory 230, or a combination thereof.

Additionally, the method 400 can include, at 430, determining a current second clearance, such as the current LP turbine blade tip clearance 284. In non-limiting aspects, the determining the current LP blade tip clearance 284 can include determining a second value indicative of the current LP turbine blade tip clearance 284. The LP turbine blade tip clearance can define a gap or space between a distal tip of one or more LP turbine blades 84 and the core casing 46. The second value indicative of the current LP turbine blade tip clearance 284 can be determined by the control module 210 based on one or more inputs 274. The one or more inputs 274 to the control module 210 can include one or more measured, calculated, or otherwise determined values indicative of the current LP turbine blade tip clearance 284.

At 435, the method 400 can include comparing the determined second value indicative of the current LP turbine blade tip clearance 284 with the predetermined second desired clearance 286, to define the second differential value 288. In non-limiting aspects, the control module 210 can be configured to compare the determined second value indicative of the current LP turbine blade tip clearance 284 with the predetermined second desired clearance 286 to define the second differential value 288. The predetermined second desired clearance 286 can be saved to the memory 230. In some aspects, the predetermined second desired clearance 286 can be based on inputs 274 to the control module 210 indicative of the value of operating conditions or parameters, data saved in the memory 230, or calculated values, or combinations thereof. For example, in non-limiting aspects, the operating conditions and parameters that can be sensed, calculated, and/or modeled include, without limitation, a HP turbine blade tip clearance, a LP turbine blade tip clearance, a fan blade tip clearance, a seal tooth clearance, an altitude, an ambient temperature, an exhaust gas temperature, a compressor discharge temperature, an inlet low-pressure compressor temperature, a specific fuel consumption, an engine efficiency, a Mach number, a thrust, an airspeed, a fan flow, a core flow, a current electrical current draw of the first and second electric machines 51, 52, a fan speed, a core speed, an engine inlet pressure, a bypass passage pressure, an inlet high-pressure compressor pressure, a compressor discharge pressure, a high-pressure turbine pressure, an accelerometer measurement, a flight control position, and/or one or more waypoints of a mission (e.g., the origin, the destination, and one or more points therebetween), and the like. The second differential value 288 can be saved to memory 230. It is contemplated that the second differential value 288 in various instances can have a positive value, a negative value, or a value of zero.

At 440, the method 400 can include comparing the second differential value 288 to a predetermined second differential threshold 292. The control module 210 can compare the second differential value 288 to the predetermined second differential threshold 292 to determine if the second differential value 288 satisfies the predetermined second differential threshold 292. The predetermined second differential threshold 292 can be saved in memory 230.

In the event that the second differential value 288 satisfies the predetermined second differential threshold 292, the method 400 can include, at 450, executing the thrust demand schedule 226. The control module 210 can be configured to execute the thrust demand schedule 226 such that the thrust demand is met or substantially met. For example, meeting the thrust demand can include executing the thrust demand schedule 226 in accordance with the nominal fourth rate of change 282 (e.g., an acceleration or a deceleration) of the rotational speed of the LP shaft 56.

In the event that the second differential value 288 does not satisfy the predetermined second differential threshold 292, the method 400 can include, at 455, determining or calculating an optimized fifth rate of change 290 in the second rotational speed of the LP shaft 56. The control module 210 can calculate the optimized fifth rate of change 290 in the second rotational speed of the LP shaft 56. The optimized fifth rate of change 290 can be different from the nominal second rate of change 282. More specifically, regardless of whether the current change in the thrust demand calls for an acceleration or deceleration of the rotational speed of the LP shaft 56, the optimized fifth rate of change 290 can be greater or lesser than the nominal fourth rate of change 282. The optimized fifth rate of change 290 can be based on the second differential value 288 and the nominal fourth rate of change 282.

The method 400 can further include, controlling an operation of the second electric machine 52 to control the speed of the LP shaft 56 in accordance with the optimized fifth rate of change 290. For example, in the event that the optimized fifth rate of change 290 is greater than the nominal fourth rate of change 282, the method 400 can include, at 460, controlling the speed of the LP shaft 56 by providing electrical power to the second electric machine 52. The electric power causes the second electric machine 52 to rotate and apply torque to the LP shaft 56, causing the LP shaft 56 to increase in rotational speed. In some implementations, the second electric machine 52 applies torque to the LP shaft 56 such that the rotational speed of the LP Shaft 56 changes independent of the HP shaft 48.

Conversely, in the event that the optimized fifth rate of change 290 is less than the nominal fourth rate of change 282, the method 400 can include, at 465, controlling the speed of the LP shaft 56 by reducing or cutting off electrical power to the second electric machine 52 and providing electrical power from the second electric machine 52 to the set of electrical loads 131. For example, the control module 210 can be configured to control the second electric machine 52 to operate in a generator mode, that is, by ceasing providing electrical power to the second electric machine, while the HP shaft 56 is rotating.

The rotation of the second electric machine 52 by the LP shaft 56 causes the first electric machine 52 to apply a drag or rotational load on the LP shaft 56, causing the LP shaft 56 to decrease in rotational speed, or to increase in rotational speed a slower rate. In some implementations, the second electric machine 52 can apply the drag or rotational load on the LP shaft 56, such that the rotational speed of the LP shaft 56 changes independent of the HP shaft 48.

Hybrid-electric gas turbine engines employing the disclosed aspects can benefit from the independent control of the acceleration and deceleration rates of the HP spool or LP spool to yield a more favorable blade tip clearance or seal tooth clearance using an optimized acceleration or deceleration schedule, while allowing the other of the HP or LP spool to accelerate or decelerate on nominal schedules.

For example, during step-climb and hot rotor reburst scenarios, pilots expect a rapid thrust response. Using aspects as disclosed herein, the LP spool can be controlled to accelerate to the target speed based on a nominal acceleration schedule, while the HP pool can be accelerated up to the target speed more gradually than the LP spool, providing time for the turbine blades and other mechanical structures to thermally respond. Benefits would include the ability to operate using reduced blade tip clearances than conventional techniques.

Hybrid-electric gas turbine engines employing the disclosed aspects can benefit from the independent control of the acceleration and deceleration rates of the HP spool or LP spool to yield a more favorable management of transient thermal gradients over conventional techniques thereby improving life of components, while optimizing engine performance.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A method of operating a hybrid-electric gas turbine engine having a core including a casing enclosing a compressor, combustor, and turbine, with at least first and second spools, the first spool defined by a first set of compressor blades and a first set of turbine blades coupled to a rotatable first shaft, and a first electric machine rotatably coupled the first shaft, and the second spool defined by a second set of compressor blades and a second set of turbine blades coupled to a rotatable second shaft, the method comprising: receiving an input indicative of a change in thrust demand to the hybrid-electric gas turbine engine; determining a first rate of change of thrust attributable to combustion in the combustor and a second rate of change of thrust attributable to the first electric machine to cooperatively satisfy the change in thrust demand; determining a current first clearance between the casing and at least one of the first set of turbine blades and the first set of compressor blades; determining that operation of the combustor in accordance with the first rate of change of thrust and the first electric machine in accordance with the second rate of change of thrust will cause the current first clearance to exceed a predetermined first differential threshold; determining a third rate of change of thrust attributable to the first electric machine to satisfy the change in thrust demand in cooperation with the first rate of change of thrust, to satisfy the change in thrust demand and not exceed the first differential threshold; and operating the combustor according to the first rate of change of thrust and operating the first electric machine according to the third rate of change of thrust.

The method of the preceding clause, wherein the determining that operation of the combustor in accordance with the first rate of change of thrust and the first electric machine in accordance with the second rate of change of thrust will cause the current first clearance to exceed the predetermined first differential threshold comprises comparing the current first clearance to a reference value.

The method of any preceding clause, wherein comparing the current first clearance to the reference value comprises comparing the current first clearance to a desired first clearance, and determining a difference between the current first clearance and the desired first clearance.

The method of any preceding clause, wherein comparing the current first clearance to the desired first clearance comprises comparing the difference between the current first clearance and the desired first clearance to a first differential threshold.

The method of any preceding clause, wherein, in the event the third rate of change of thrust is greater than the second rate of change of thrust, the operating the first electric machine according to the third rate of change of thrust includes increasing a torque on the first shaft via the first electric machine by providing electrical power to the first electric machine.

The method of any preceding clause, wherein, in the event the third rate of change of thrust is less than the second rate of change of thrust, the operating the first electric machine according to the third rate of change of thrust includes decreasing a torque on the first shaft by providing electrical power from the first electric machine to an electrical load.

The method of any preceding clause, wherein the hybrid-electric gas turbine engine further includes a second electric machine rotatably coupled to the second shaft, the method further comprising: determining a fourth rate of change of thrust attributable to the second electric machine to cooperatively satisfy the change in thrust demand in cooperation with the first rate of change of thrust; determining a current second clearance between the casing and at least one of the second set of turbine blades and the second set of compressor blades; determining that operation of the combustor in accordance with the first rate of change of thrust and the second electric machine in accordance with fourth rate of change of thrust will cause the current second clearance to exceed a predetermined second differential threshold; determining a fifth rate of change of thrust attributable to the second electric machine to satisfy the change in thrust demand in cooperation with the first rate of change of thrust, and not exceed the second differential threshold; and operating the combustor according to the first rate of change of thrust and operating the second electric machine according to the fifth rate of change of thrust.

The method any preceding clause, wherein the determining that operation of the combustor in accordance with the first rate of change of thrust and the second electric machine in accordance with fourth rate of change of thrust will cause the current second clearance to exceed a predetermined second differential threshold comprises comparing the current second clearance to a reference value.

The method of any preceding clause, wherein comparing the current second clearance to the reference value comprises comparing the current second clearance to a desired second clearance, and determining a difference between the current second clearance and desired second clearance.

The method of any preceding clause, wherein comparing the current second clearance to the desired second clearance comprises comparing the difference between the current second clearance and desired second clearance to a second differential threshold.

The method of any preceding clause, wherein in the event the fifth rate of change of thrust is greater than the fourth rate of change of thrust, the operating the second electric machine according to the fifth rate of change of thrust includes increasing a torque on the second shaft via the second electric machine by providing electrical power to the second electric machine.

The method of any preceding clause, wherein in the event the fifth rate of change of thrust is less than the fourth rate of change of thrust, operating the second electric machine according to the fifth rate of change of thrust includes decreasing a torque on the second shaft by providing electrical power from the second electric machine to an electrical load.

A hybrid-electric gas turbine engine, comprising: a core including a casing enclosing a compressor, combustor, and turbine, with at least first and second spools, the first spool defined by a first set of compressor blades and a first set of turbine blades coupled to a rotatable first shaft, a first electric machine rotatably coupled to the first shaft, and the second spool defined by a second set of compressor blades and a second set of turbine blades coupled to a rotatable second shaft; and a control system including a control module having one or more processors and one or more memory devices, the one or more memory devices storing instructions that when executed by the one or more processors cause the one or more processors to perform operations, in performing the operations, the one or more processors are configured to: receive an input indicative of a change in a thrust demand to the gas turbine engine; determine a first rate of change of thrust attributable to combustion in the combustor and a second rate of change of thrust attributable to the first electric machine to cooperatively satisfy the change in thrust demand; determine a current first clearance between the casing and at least one of the first set of turbine blades and the first set of compressor blades; determine that operation of the combustor in accordance with the first rate of change of thrust and the first electric machine in accordance with the second rate of change of thrust will cause the current first clearance to exceed a predetermined first differential threshold; determine a third rate of change of thrust attributable to the first electric machine to satisfy the change in thrust demand in cooperation with the first rate of change of thrust, to satisfy the change in thrust demand and not exceed the first differential threshold; and operate the combustor according to the first rate of change of thrust and operate the first electric machine according to the third rate of change of thrust.

The hybrid-electric gas turbine engine of any preceding clause, wherein the one or more processors are configured to determine that operation of the combustor in accordance with the first rate of change of thrust and the first electric machine in accordance with the second rate of change of thrust will cause the current first clearance to exceed the predetermined first differential threshold based on a comparison of the current first clearance to a reference value.

The hybrid-electric gas turbine engine of any preceding clause, wherein the comparison of the current first clearance to the reference value includes a comparison of the current first clearance to a desired first clearance, and a determination of a difference between the current first clearance and the desired first clearance.

The hybrid-electric gas turbine engine of any preceding clause, wherein when the third rate of change of thrust is greater than the second rate of change of thrust, the one or more processors are further configured operate the first electric machine according to the third rate of change of thrust to increase a torque on the first shaft via the first electric machine by providing power to the first electric machine.

The hybrid-electric gas turbine engine of any preceding clause, wherein when the third rate of change of thrust is less than the second rate of change of thrust, the one or more processors are further configured to operate the first electric machine according to the third rate of change of thrust to decrease a torque on the first shaft by providing electrical power from the first electric machine to an electrical load.

The hybrid-electric gas turbine engine of any preceding clause, further comprising: a second electric machine rotatably coupled to the second shaft; wherein the one or more processors are further configured to: determine a fourth rate of change of thrust attributable to the second electric machine to cooperatively satisfy the change in thrust demand in cooperation with the first rate of change of thrust; determine a current second clearance between the second set of turbine blades and the casing; determine that operation of the combustor in accordance with the first rate of change of thrust and the second electric machine in accordance with fourth rate of change of thrust will cause the current second clearance to exceed a predetermined second differential threshold; determine a fifth rate of change of thrust attributable to the second electric machine to satisfy the change in thrust demand in cooperation with the first rate of change of thrust, and not exceed the second differential threshold; and operate the combustor according to the first rate of change of thrust and operate the second electric machine according to the fifth rate of change of thrust.

The hybrid-electric gas turbine engine of any preceding clause, wherein when the fifth rate of change of thrust is greater than the fourth rate of change of thrust, the one or more processors are further configured operate the second electric machine according to the fifth rate of change of thrust to increase a torque on the second shaft via the second electric machine by providing power to the second electric machine.

The hybrid-electric gas turbine engine of any preceding clause, wherein when the fifth rate of change of thrust is less than the fourth rate of change of thrust, the one or more processors are further configured to operate the second electric machine according to the fifth rate of change of thrust to decrease a torque on the second shaft by providing electrical power from the second electric machine to an electrical load.

A control module A non-transitory computer readable medium comprising instructions that, when executed, cause a processor to at least:

having one or more processors and one or more memory devices, the one or more memory devices storing instructions that when executed by the one or more processors cause the one or more processors to perform operations, in performing the operations, the one or more processors are configured to: receive an input indicative of a change in a thrust demand to a gas turbine engine, the gas turbine engine including; a core including a casing enclosing a compressor, combustor, and turbine, with at least first and second spools, the first spool defined by a first set of compressor blades and a first set of turbine blades coupled to a rotatable first shaft, a first electric machine rotatably coupled to the first shaft, and the second spool defined by a second set of compressor blades and a second set of turbine blades coupled to a rotatable second shaft; determine a first rate of change of thrust attributable to combustion in the combustor and a second rate of change of thrust attributable to the first electric machine to cooperatively satisfy the change in thrust demand; determine a current first clearance between the casing and at least one of the first set of turbine blades and the first set of compressor blades; determine that operation of the combustor in accordance with the first rate of change of thrust and the first electric machine in accordance with the second rate of change of thrust will cause the current first clearance to exceed a predetermined first differential threshold; determine a third rate of change of thrust attributable to the first electric machine to satisfy the change in thrust demand in cooperation with the first rate of change of thrust, that will satisfy the change in thrust demand and not exceed the first differential threshold; and operate the combustor according to the first rate of change of thrust and operate the first electric machine according to the third rate of change of thrust.

The hybrid-electric gas turbine engine of any preceding clause, wherein the one or more processors are configured to determine that operation of the combustor in accordance with the first rate of change of thrust and the first electric machine in accordance with the second rate of change of thrust will cause the current first clearance to exceed the predetermined first differential threshold based on a comparison of the current first clearance to a reference value.

The hybrid-electric gas turbine engine of any preceding clause, wherein the comparison of the current first clearance to the reference value includes a comparison of the current first clearance to a desired first clearance, and a determination of a difference between the current first clearance and the desired first clearance.

The hybrid-electric gas turbine engine of any preceding clause, wherein when the third rate of change of thrust is greater than the second rate of change of thrust, the one or more processors are further configured operate the first electric machine according to the third rate of change of thrust to increase a torque on the first shaft via the first electric machine by providing power to the first electric machine.

The hybrid-electric gas turbine engine of any preceding clause, wherein when the third rate of change of thrust is less than the second rate of change of thrust, the one or more processors are further configured to operate the first electric machine according to the third rate of change of thrust to decrease a torque on the first shaft by providing electrical power from the first electric machine to an electrical load.

The hybrid-electric gas turbine engine of any preceding clause, further comprising: a second electric machine rotatably coupled to the second shaft; wherein the one or more processors are further configured to: determine a fourth rate of change of thrust attributable to the second electric machine to cooperatively satisfy the change in thrust demand in cooperation with the first rate of change of thrust; determine a current second clearance between the second set of turbine blades and the casing; determine that operation of the combustor in accordance with the first rate of change of thrust and the second electric machine in accordance with fourth rate of change of thrust will cause the current second clearance to exceed a predetermined second differential threshold; determine a fifth rate of change of thrust attributable to the second electric machine to satisfy the change in thrust demand in cooperation with the first rate of change of thrust, and not exceed the second differential threshold; and operate the combustor according to the first rate of change of thrust and operate the second electric machine according to the fifth rate of change of thrust.

The hybrid-electric gas turbine engine of any preceding clause, wherein when the fifth rate of change of thrust is greater than the fourth rate of change of thrust, the one or more processors are further configured operate the second electric machine according to the fifth rate of change of thrust to increase a torque on the second shaft via the second electric machine by providing power to the second electric machine.

The hybrid-electric gas turbine engine of any preceding clause, wherein when the fifth rate of change of thrust is less than the fourth rate of change of thrust, the one or more processors are further configured to operate the second electric machine according to the fifth rate of change of thrust to decrease a torque on the second shaft by providing electrical power from the second electric machine to an electrical load.

A non-transitory computer readable medium comprising instructions that, when executed, cause a processor to at least: receive an input indicative of a change in a thrust demand to a gas turbine engine, the gas turbine engine including; a core including a casing enclosing a compressor, combustor, and turbine, with at least first and second spools, the first spool defined by a first set of compressor blades and a first set of turbine blades coupled to a rotatable first shaft, a first electric machine rotatably coupled to the first shaft, and the second spool defined by a second set of compressor blades and a second set of turbine blades coupled to a rotatable second shaft; determine a first rate of change of thrust attributable to combustion in the combustor and a second rate of change of thrust attributable to the first electric machine to cooperatively satisfy the change in thrust demand; determine a current first clearance between the casing and at least one of the first set of turbine blades and the first set of compressor blades; determine that operation of the combustor in accordance with the first rate of change of thrust and the first electric machine in accordance with the second rate of change of thrust will cause the current first clearance to exceed a predetermined first differential threshold; determine a third rate of change of thrust attributable to the first electric machine to satisfy the change in thrust demand in cooperation with the first rate of change of thrust, that will satisfy the change in thrust demand and not exceed the first differential threshold; and operate the combustor according to the first rate of change of thrust and operate the first electric machine according to the third rate of change of thrust.

What is claimed is:

1. A method of operating a hybrid-electric gas turbine engine having a core including a casing enclosing a compressor, combustor, and turbine, with at least first and second spools, the first spool defined by a first set of compressor blades and a first set of turbine blades coupled to a rotatable first shaft, and a first electric machine rotatably coupled the rotatable first shaft, and the second spool defined by a second set of compressor blades and a second set of turbine blades coupled to a rotatable second shaft, the method comprising:
receiving an input indicative of a change in thrust demand to the hybrid-electric gas turbine engine;
determining a first rate of change of thrust attributable to combustion in the combustor and a second rate of change of thrust attributable to the first electric machine to cooperatively satisfy the change in thrust demand;
determining a current first clearance between the casing and at least one of the first set of turbine blades and the first set of compressor blades;
determining that operation of the combustor in accordance with the first rate of change of thrust and operation of the first electric machine in accordance with the second rate of change of thrust will cause the current first clearance to exceed a predetermined first differential threshold;
determining a third rate of change of thrust attributable to the first electric machine to satisfy the change in thrust demand in cooperation with the first rate of change of thrust, that will satisfy the change in thrust demand and not exceed the first differential threshold; and
operating the combustor according to the first rate of change of thrust and operating the first electric machine according to the third rate of change of thrust.

2. The method of claim 1 wherein the determining that operation of the combustor in accordance with the first rate of change of thrust and the first electric machine in accordance with the second rate of change of thrust will cause the current first clearance to exceed the predetermined first differential threshold comprises comparing the current first clearance to a reference value.

3. The method of claim 2 wherein comparing the current first clearance to the reference value comprises comparing the current first clearance to a desired first clearance, and determining a difference between the current first clearance and the desired first clearance.

4. The method of claim 3, wherein comparing the current first clearance to the desired first clearance comprises comparing the difference between the current first clearance and the desired first clearance to a first differential threshold.

5. The method of claim 1, wherein, when the third rate of change of thrust is greater than the second rate of change of thrust, the operating the first electric machine according to the third rate of change of thrust includes increasing a torque on the rotatable first shaft via the first electric machine by providing electrical power to the first electric machine.

6. The method of claim 1, wherein, in the event the third rate of change of thrust is less than the second rate of change of thrust, the operating the first electric machine according to the third rate of change of thrust includes decreasing a torque on the rotatable first shaft by providing electrical power from the first electric machine to an electrical load.

7. The method of claim 1, wherein the hybrid-electric gas turbine engine further includes a second electric machine rotatably coupled to the rotatable second shaft, the method further comprising:
determining a fourth rate of change of thrust attributable to the second electric machine to cooperatively satisfy the change in thrust demand in cooperation with the first rate of change of thrust;
determining a current second clearance between the casing and at least one of the second set of turbine blades and the second set of compressor blades;
determining that operation of the combustor in accordance with the first rate of change of thrust and the second electric machine in accordance with fourth rate of change of thrust will cause the current second clearance to exceed a predetermined second differential threshold;
determining a fifth rate of change of thrust attributable to the second electric machine to satisfy the change in thrust demand in cooperation with the first rate of change of thrust, and not exceed the second differential threshold; and operating the combustor according to the first rate of change of thrust and operating the second electric machine according to the fifth rate of change of thrust.

8. The method of claim 7, wherein the determining that operation of the combustor in accordance with the first rate of change of thrust and the second electric machine in accordance with fourth rate of change of thrust will cause the current second clearance to exceed a predetermined second differential threshold comprises comparing the current second clearance to a reference value.

9. The method of claim 8, wherein comparing the current second clearance to the reference value comprises comparing the current second clearance to a desired second clearance, and determining a difference between the current second clearance and desired second clearance.

10. The method of claim 9, wherein comparing the current second clearance to the desired second clearance comprises comparing the difference between the current second clearance and desired second clearance to a second differential threshold.

11. The method of claim 7, wherein in the event the fifth rate of change of thrust is greater than the fourth rate of change of thrust, the operating the second electric machine according to the fifth rate of change of thrust includes increasing a torque on the rotatable second shaft via the second electric machine by providing electrical power to the second electric machine.

12. The method of claim 7, wherein in the event the fifth rate of change of thrust is less than the fourth rate of change of thrust, operating the second electric machine according to the fifth rate of change of thrust includes decreasing a torque on the rotatable second shaft providing electrical power from the second electric machine to an electrical load.

13. A hybrid-electric gas turbine engine, comprising:
a core including a casing enclosing a compressor, combustor, and turbine, with at least first and second spools, the first spool defined by a first set of compressor blades and a first set of turbine blades coupled to a rotatable first shaft, a first electric machine rotatably coupled to the rotatable first shaft, and the second spool defined by a second set of compressor blades and a second set of turbine blades coupled to a rotatable second shaft; and
a control system including a control module having one or more processors and one or more memory devices, the one or more memory devices storing instructions that when executed by the one or more processors cause the one or more processors to perform operations, in performing the operations, the one or more processors are configured to:
receive an input indicative of a change in a thrust demand to the gas turbine engine;
determine a first rate of change of thrust attributable to combustion in the combustor and a second rate of change of thrust attributable to the first electric machine to cooperatively satisfy the change in thrust demand;
determine a current first clearance between the casing and at least one of the first set of turbine blades and the first set of compressor blades;
determine that operation of the combustor in accordance with the first rate of change of thrust and the first electric machine in accordance with the second rate of change of thrust will cause the current first clearance to exceed a predetermined first differential threshold;
determine a third rate of change of thrust attributable to the first electric machine to satisfy the change in thrust demand in cooperation with the first rate of change of thrust, that will satisfy the change in thrust demand and not exceed the first differential threshold; and
operate the combustor according to the first rate of change of thrust and operate the first electric machine according to the third rate of change of thrust.

14. The hybrid-electric gas turbine engine of claim 13, wherein the one or more processors are configured to determine that operation of the combustor in accordance with the first rate of change of thrust and the first electric machine in accordance with the second rate of change of thrust will cause the current first clearance to exceed the predetermined first differential threshold based on a comparison of the current first clearance to a reference value.

15. The hybrid-electric gas turbine engine of claim 14, wherein the comparison of the current first clearance to the reference value includes a comparison of the current first clearance to a desired first clearance, and a determination of a difference between the current first clearance and the desired first clearance.

16. The hybrid-electric gas turbine engine of claim 14, wherein when the third rate of change of thrust is greater than the second rate of change of thrust, the one or more processors are further configured to operate the first electric machine according to the third rate of change of thrust to increase a torque on the rotatable first shafts via the first electric machine by providing power to the first electric machine.

17. The hybrid-electric gas turbine engine of claim 14, wherein when the third rate of change of thrust is less than the second rate of change of thrust, the one or more processors are further configured to operate the first electric machine according to the third rate of change of thrust to decrease a torque on the rotatable first shaft by providing electrical power from the first electric machine to an electrical load.

18. The hybrid-electric gas turbine engine of claim 14, further comprising:
a second electric machine rotatably coupled to the rotatable second shaft; wherein the one or more processors are further configured to:
determine a fourth rate of change of thrust attributable to the second electric machine to cooperatively satisfy the change in thrust demand in cooperation with the first rate of change of thrust;
determine a current second clearance between the second set of turbine blades and the casing;
determine that operation of the combustor in accordance with the first rate of change of thrust and the second electric machine in accordance with fourth rate of change of thrust will cause the current second clearance to exceed a predetermined second differential threshold;
determine a fifth rate of change of thrust attributable to the second electric machine to satisfy the change in thrust demand in cooperation with the first rate of change of thrust, and not exceed the second differential threshold; and
operate the combustor according to the first rate of change of thrust and operate the second electric machine according to the fifth rate of change of thrust.

19. The hybrid-electric gas turbine engine of claim 18, wherein when the fifth rate of change of thrust is eater than the fourth rate of change of thrust, the one or more processors are further configured to operate the second electric machine according to the fifth rate of change of thrust to increase a torque on the rotatable second shaft via the second electric machine by providing power to the second electric machine.

20. The hybrid-electric gas turbine engine of claim 18, wherein when the fifth rate of change of thrust is less than the fourth rate of change of thrust, the one or more processors are further configured to operate the second electric machine according to the fifth rate of change of thrust to decrease a torque on the rotatable second shaft by providing electrical power from the second electric machine to an electrical load.

\* \* \* \* \*

UNITED STATES PATENT AND TRADEMARK OFFICE
CERTIFICATE OF CORRECTION

| | |
|---|---|
| PATENT NO. | : 11,933,232 B1 |
| APPLICATION NO. | : 18/171942 |
| DATED | : March 19, 2024 |
| INVENTOR(S) | : Timothy L. Schelfaut et al. |

Page 1 of 1

It is certified that error appears in the above-identified patent and that said Letters Patent is hereby corrected as shown below:

In the Claims

Column 32, Claim 16, Line 26:
". . . on the rotatable first shafts via the first . . ." should be ". . . on the rotatable first shaft via the first . . ."

Column 32, Claim 19, Line 64:
". . . the fifth rate of change of thrust is eater than. . ." should be ". . . the fifth rate of change of thrust is greater than. . ."

Signed and Sealed this
Fourth Day of February, 2025

Coke Morgan Stewart
*Acting Director of the United States Patent and Trademark Office*